United States Patent
Mayo et al.

(10) Patent No.: US 12,019,620 B2
(45) Date of Patent: Jun. 25, 2024

(54) JOURNAL GROUPS FOR METADATA HOUSEKEEPING OPERATION

(71) Applicant: HEWLETT PACKARD ENTERPRISE DEVELOPMENT LP, Houston, TX (US)

(72) Inventors: Richard Phillip Mayo, Bristol (GB); Callum Murray, Bristol (GB); David Malcolm Falkinder, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 29 days.

(21) Appl. No.: 17/586,131

(22) Filed: Jan. 27, 2022

(65) Prior Publication Data

US 2023/0237048 A1 Jul. 27, 2023

(51) Int. Cl.
| | | |
|---|---|---|
| *G06F 16/9535* | (2019.01) | |
| *G06F 8/20* | (2018.01) | |
| *G06F 16/23* | (2019.01) | |
| *G06F 16/2455* | (2019.01) | |
| *G06F 16/248* | (2019.01) | |
| *G06F 16/28* | (2019.01) | |
| *G06F 16/951* | (2019.01) | |

(52) U.S. Cl.
CPC ........ *G06F 16/2379* (2019.01); *G06F 16/285* (2019.01)

(58) Field of Classification Search
CPC .. G06F 16/2379; G06F 16/285; G06F 16/215; G06F 16/2282
See application file for complete search history.

(56) References Cited

U.S. PATENT DOCUMENTS

| | | | |
|---|---|---|---|
| 4,819,156 A | | 4/1989 | DeLorme et al. |
| 6,298,345 B1 * | | 10/2001 | Armstrong, Jr. ..... G06F 11/1471 |
| 6,947,956 B2 | | 9/2005 | Olstad et al. |
| 7,698,294 B2 | | 4/2010 | Ma et al. |
| 8,200,627 B2 | | 6/2012 | Youngren |
| 8,712,970 B1 * | | 4/2014 | Sim-Tang ............... G06F 16/20 |
| | | | 707/672 |
| 8,799,238 B2 | | 8/2014 | Eshghi et al. |
| 10,423,493 B1 | | 9/2019 | Vig et al. |
| 10,853,182 B1 | | 12/2020 | Vig et al. |
| 2005/0015416 A1 * | | 1/2005 | Yamagami .......... G06F 11/1471 |

(Continued)

*Primary Examiner* — Apu M Mofiz
*Assistant Examiner* — Oscar Wehovz
(74) *Attorney, Agent, or Firm* — Trop, Pruner & Hu, P.C.

(57) ABSTRACT

Example implementations relate to metadata operations in a storage system. An example includes detecting, by a storage controller of a deduplication storage system, a housekeeping operation to perform updates to data of a set of container indexes of stored deduplicated data; in response to a detection of the housekeeping operation, the storage controller identifying, among the set of container indexes, a plurality of container indexes associated with a particular journal group, the particular journal group comprising a plurality of journals to store updates to data of the plurality of container indexes, respectively; and maintaining, by the storage controller, the particular journal group loaded in memory until all of the updates of the housekeeping operation to the plurality of container indexes have been stored in the respective journals of the particular journal group.

20 Claims, 8 Drawing Sheets

(56) References Cited

U.S. PATENT DOCUMENTS

| | | | |
|---|---|---|---|
| 2012/0246132 A1* | 9/2012 | Sebastian | G06F 16/2379 |
| | | | 707/696 |
| 2014/0379715 A1* | 12/2014 | Kesselman | G06F 3/0605 |
| | | | 707/737 |
| 2015/0066877 A1 | 3/2015 | Lillibridge et al. | |
| 2015/0347553 A1* | 12/2015 | Aizman | G06F 16/273 |
| | | | 707/613 |
| 2018/0314728 A1* | 11/2018 | Chaurasia | G06F 11/1471 |
| 2019/0121705 A1* | 4/2019 | Mayo | G06F 11/1435 |
| 2020/0241784 A1 | 7/2020 | Mayo et al. | |
| 2020/0320040 A1 | 10/2020 | Butt | |
| 2022/0107921 A1 | 4/2022 | Mayo et al. | |
| 2022/0342902 A1 | 10/2022 | Falkinder et al. | |

\* cited by examiner

Look-up Table 186

| Container Index | Journal Group |
|---|---|
| CI0 | JG12 |
| CI1 | JG26 |
| CI2 | JG21 |
| ---- | ---- |

FIG. 5A

Work Map 180

| Container Index | Address | Ref. Count Decrease |
|---|---|---|
| CI0 | Addr100 | 6 |
| CI0 | Adrr101 | 5 |
| CI0 | Addr102 | 8 |
| CI1 | Addr305 | 11 |
| CI1 | Addr306 | 2 |
| ---- | ---- | ---- |

FIG. 5B

JOURNAL GROUPS FOR METADATA HOUSEKEEPING OPERATION

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIGS. 5A-5B are illustrations of example data structures, in accordance with some implementations.

Figure 1:
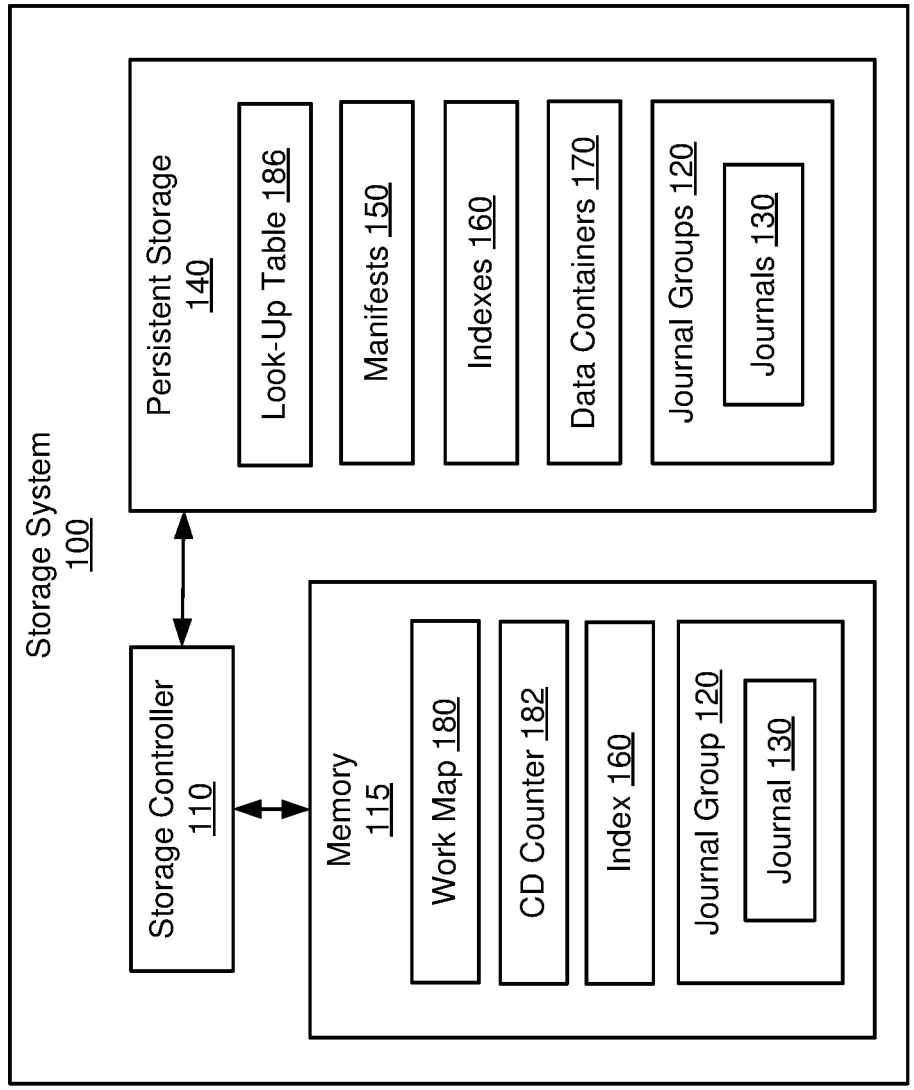
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units or "chunks." Further, the storage system may determine identifiers or "fingerprints" of incoming data units, and may determine which incoming data units are duplicates of previously stored data units. In the case of data units that are duplicates, the storage system may store references to the previous data units instead of storing the duplicate incoming data units.

As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing one or more inbound data streams (e.g., multiple concurrent inbound data streams). For example, such metadata may include data recipes (also referred to herein as "manifests") that specify the order in which particular data units are received (e.g., in a data stream). Subsequently, in response to a read request, the deduplication system may use a set of manifests (also referred to herein as "item metadata") to determine the received order of data units, and may thereby recreate the original data stream. Accordingly, the set of manifests may be a representation of the original data stream. The manifests may include a sequence of records, with each record representing a particular set of data unit(s). The records of the manifest may include one or more fields (also referred to herein as "pointer information") that identify indexes that include storage information for the data units. For example, an index may include one or more fields that specify location information (e.g., containers, offsets, etc.) for the stored data units, compression and/or encryption characteristics of the stored data units, and so forth. Further, the index may include reference counts that indicate the number of manifests that reference each data unit.

In some examples, the deduplication storage system may perform housekeeping processes to maintain the accuracy of the included metadata. For example, when a data unit is deleted from a given manifest (e.g., due to a change to the data stream or item represented by the manifest), the reference count for that data unit may be decremented by one (i.e., indicating that the data unit is referenced by one less manifest). In some examples, such housekeeping operations may involve loading an index into memory to decrement the reference counts included in the index. Further, after the reference counts are decremented, the index may be written to a persistent storage (e.g., during a memory flush). In some examples, the entire index may have to be written to persistent storage as a whole unit in order to preserve encryption and/or compression of the index, to maintain compatibility with a storage system, and so forth. However, in some examples, the reference count changes may have only affected a relatively small portion of the index (e.g., one record out of ten thousand records in the index) while the index was loaded in memory. Therefore, in such examples, writing the entire index to persistent storage will consume much more system processing time and bandwidth than would be required if only the changed portion was being written to persistent storage. Accordingly, in some examples, the changes to the reference counts may be stored in a journal associated with the index, rather than in the index itself. Because the journal is limited to recording the changes to the index (and not the full data of the index), writing the journal to persistent storage will consume relatively less processing time and bandwidth than if the entire index was being written to persistent storage.

In some examples, a journal group may be formed from multiple journals, where each of the journals in the journal group is associated with a respective index storing metadata associated with a single object stored in the deduplication system (e.g., a file, a table, and so forth). As such, a journal group may exclusively include journals associated with a single stored object. In some examples, any metadata changes to the data units of a single stored object may be more likely to occur in temporal proximity to each other (i.e., near in time). Accordingly, the total number of write operations to persistent storage may be reduced by writing, to persistent storage, entire journal groups (e.g., of one or more journals written near in time to one another) rather than writing individual journals piecemeal.

In some examples, a housekeeping process may involve processing manifests in batches, where each batch comprises a plurality of manifests that collectively represent a continuous range of user data provided to the system. Such batch processing may reduce the number of load and write operations performed for the same index. In some examples, the batch processing may include loading all manifests for a batch into memory, identifying the set of indexes affected by the changes to the manifests, loading the identified indexes into memory, loading the associated journals groups (i.e., including the journals associated with the identified indexes) into memory, updating the journals, and writing the journal groups to storage. However, in some examples, the processing of a single batch may involve multiple load and write operations (i.e., reading from storage to memory, and writing from memory to storage) for each journal group. For example, when processing a group of indexes that are associated with a particular journal group, the processing may occur in an order that updates that journal group at different points in time. As such, the journal group may be removed from memory (i.e., to provide memory space for other journal group(s)), and then later be reloaded into memory again for further updates. Therefore, in such examples, the multiple load and write operations for the same journal group may consume more system processing time and bandwidth than would be required for only loading the journal group into memory (and writing the journal group to storage) one time during the batch process.

In accordance with some implementations of the present disclosure, a deduplication storage system may perform a housekeeping operation that includes ordering a set of indexes according to their associated journal groups, and then loading the indexes in memory according to their sorted order. Each journal group may be maintained (or "pinned" herein) in memory during the processing of the indexes associated with that journal group (or "pinned" journal group herein). The pinned journal group may store changes to reference counts included in the associated indexes. In some implementations, a countdown counter may be initialized with the number of associated indexes that have changes to their reference counts. As each index is completed, the countdown counter may be decremented by one. Therefore, when the countdown counter is equal to zero, the journal group has been updated to include all reference count changes for the associated indexes, and in response the journal group is removed from memory, and is written to storage. In this manner, the disclosed technique may reduce the number of instances of loading a journal group into memory (and writing the journal group to storage), and may thereby improve the performance of the deduplication storage system.

FIG. 1—Example Storage System

FIG. 1 shows an example of a storage system 100 that includes a storage controller 110, memory 115, and persistent storage 140, in accordance with some implementations. As shown, the persistent storage 140 may include any number of manifests 150, indexes 160, and data containers 170. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

In some implementations, the storage system 100 may perform deduplication of stored data. For example, the storage controller 110 may divide a stream of input data into data units, and may store at least one copy of each data unit in a data container 170 (e.g., by appending the data units to the end of the container 170). In some examples, each data container 170 may be divided into portions (also referred to herein as "entities").

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints of the stored data units. If this comparison results in a match, then the storage controller 110 may determine that a duplicate of the incoming data unit is already stored by the storage system 100.

As shown in FIG. 1, the persistent storage 140 may store manifests 150, indexes 160, data containers 170, and journal groups 120. In some implementations, the storage controller 110 may generate a manifest 150 to record the order in which the data units were received. Further, the manifest 150 may include a pointer or other information indicating the index 160 that is associated with each data unit. In some implementations, the associated index 160 may indicate the location in which the data unit is stored. For example, the associated index 160 may include information specifying that the data unit is stored at a particular offset in an entity, and that the entity is stored at a particular offset in a data container 170. Further, the index 160 may include reference counts that indicate the number of manifests 150 that reference each data unit.

In some implementations, the storage controller 110 may receive a read request to access the stored data, and in response may access the manifest 150 to determine the sequence of data units that made up the original data. The storage controller 110 may then use pointer data included in the manifest 150 to identify the indexes 160 associated with the data units. Further, the storage controller 110 may use information included in the identified indexes 160 (and information included in the manifest 150) to determine the locations that store the data units (e.g., data container 170, entity, offsets, etc.), and may then read the data units from the determined locations.

In some implementations, a journal 130 may be associated with each index 160. Each journal 130 may include information indicating changes to the data stored in the index 160 associated with that journal 130. For example, when a copy of the index 160 present in memory 115 is modified to reflect a change to the metadata, that change may also be recorded as an entry in the associated journal 130. In some implementations, multiple journals 130 may be grouped in a journal group 120 associated with a single file or object stored in the deduplication system. For example, the multiple journals may correspond to indexes storing metadata associated with a single file.

In some implementations, the storage controller 110 may perform a housekeeping operation for a batch of manifests 150 (e.g., in response to a command or request, based on a periodic schedule, or the like). The housekeeping operation may involve updating reference counts (e.g., included in the indexes 160) to reflect the deletion of data unit(s) from the manifests 150 (e.g., due to a change to the data stream or item represented by the manifests 150). In some implementations, the storage controller 110 may identify a set of indexes 160 that are referenced by the manifests 150 of the batch of the housekeeping operation, and may generate a work map 180 that indicates the reference count changes in each index 160 referenced by a manifest 150 of the batch. Further, the storage controller 110 may use a stored look-up table 186 to identify the journal groups 120 that are associated with those indexes 160, and may sort the indexes 160 according to their associated journal groups 120 (e.g., according to the identifiers of the journal groups 120).

In some implementations, the storage controller 110 may load a journal group 120 in the memory 115, and set a countdown counter 182 ("CD counter") to the number of indexes 160 associated with that journal group 120. The storage controller 110 may then process the indexes 160 according to the sorted order, including, for each of the indexes 160, updating the journal group 120 to include the reference counts changes for that index 160 according to the work map 180. For each index 160 that is completed, the storage controller 110 may decrement the countdown counter 182 by one. When the countdown counter 182 reaches zero (i.e., the journal group 120 has been updated to include all reference count changes for its associated indexes 160), the storage controller 110 writes the journal group 120 to persistent storage 140, and removes the journal group 120 from the memory 115. In this manner, the storage controller 110 may reduce the number of times individual journals 130 (and journal groups 120) are loaded into memory 115 and written to persistent storage 140 during the housekeeping process. The disclosed housekeeping technique is discussed further below with reference to FIGS. 2-8.

Figure 2:
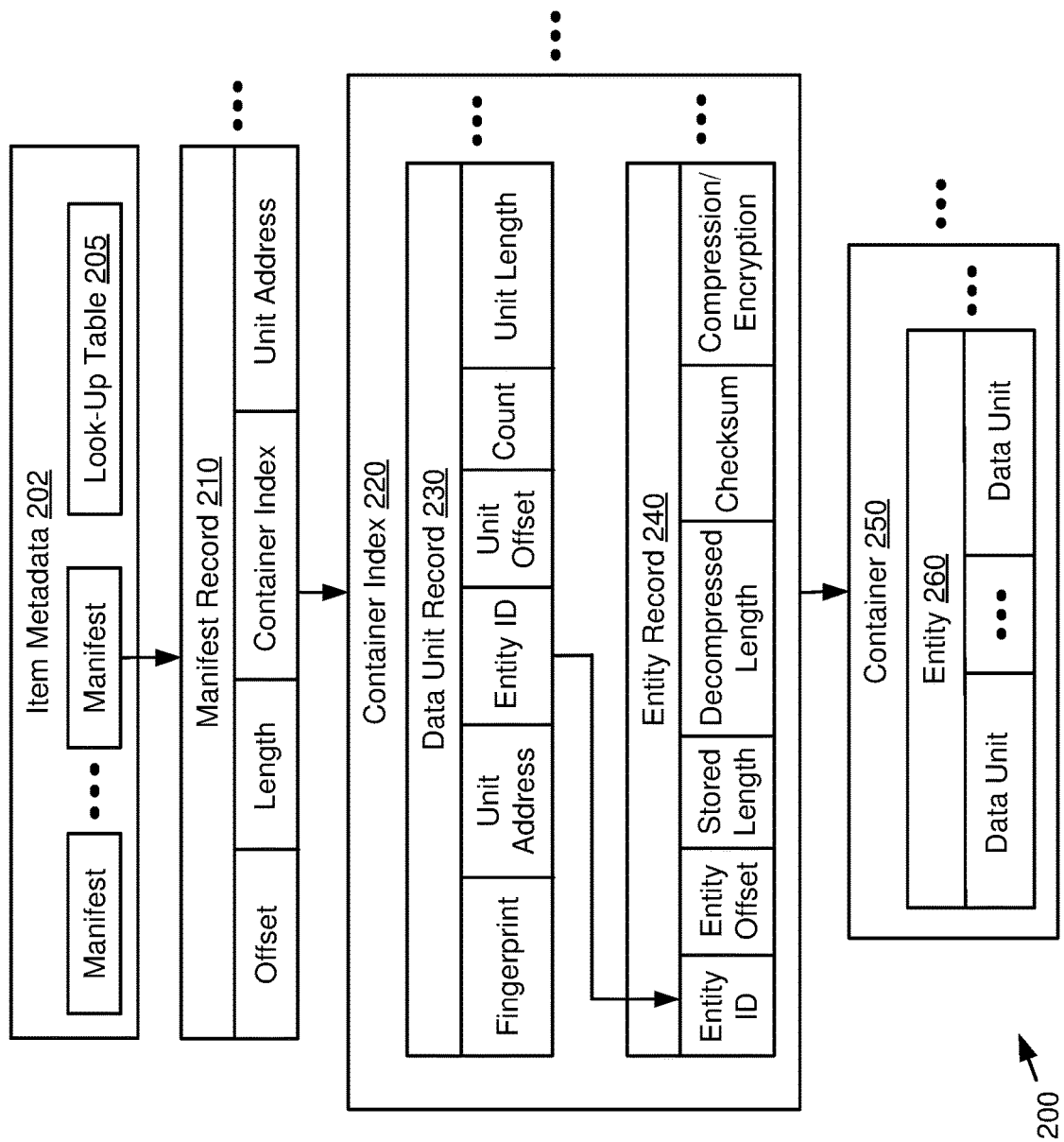
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include item metadata 202, a manifest record 210, a container index 220, and a container 250. In some implementations, the item metadata 202 may include multiple manifest records 210 and a look-up table 205. In some examples, the manifest record 210, the container index 220, the container 250, and the look-up table 205 may correspond generally to example implementations of a manifest 150, an index 160, a data container 170, and the look-up table 186 (shown in FIG. 1), respectively. In some examples, the data structures 200 may be generated and/or managed by the storage controller 110 (shown in FIG. 1).

As shown in FIG. 2, in some examples, the manifest record 210 may include various fields, such as offset, length, container index, and unit address or fingerprint. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, a unit length, or the like, or a combination thereof. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

In some implementations, the look-up table 205 may be a stored structure that identifies indexes and their associated journal groups. For example, the look-up table 205 may include multiple entries, with each entry specifying a particular index, and also specifying the particular journal group that includes the journal for storing metadata changes for that particular index. In some implementations, each entry may be added to the look-up table 205 at the time that the journal group is initially assigned to the index (e.g., at time of creation of the index). An example of the look-up table 205 is discussed below with reference to FIG. 5A. Although one of each is shown for simplicity of illustration in FIG. 2, data structures 200 may include a plurality of instances of item metadata 202, each including or pointing to one or more manifest records 210. In such examples, data structures 200 may include a plurality of manifest records 210. The manifest records 210 may reference a plurality of container indexes 220, each corresponding to one of a plurality of containers 250. Each container index 220 may comprise one or a plurality of data unit records 230, and one or a plurality of entity records 240.

Figure 3:
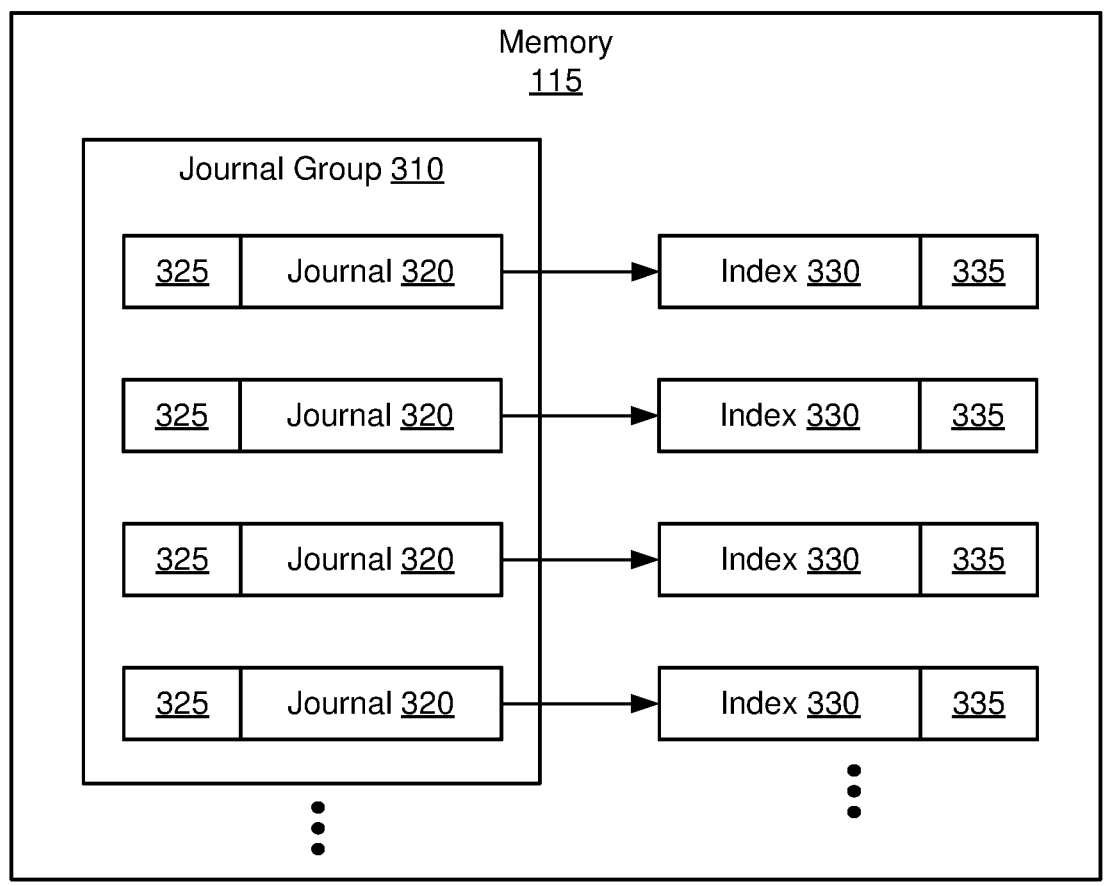
FIG. 3 is an illustration of example data structures, in accordance with some implementations.

FIG. 3—Example Data Structures

Referring now to FIG. 3, shown is an illustration of the memory 115 including a journal group 310 and multiple indexes 330. As shown, the journal group 310 includes multiple journals 320. In some examples, the journal group 310, journals 320, and indexes 330 may correspond generally to example implementations of the journal group 120, journals 130, and indexes 160 (shown in FIG. 1), respectively.

In some implementations, each journal 320 may be associated with a corresponding index 330, and may record changes to the metadata stored in the corresponding index 330. Further, for each journal group 310, all of the corresponding indexes 330 may be associated with a single stored object (e.g., a user backup, a document, a database table, a data file, and so forth). For example, all of the corresponding indexes 330 may include metadata for data units included in a single file stored in a deduplication system (e.g., storage system 100 shown in FIG. 1). In some implementations, the associations between the indexes 330 and the journal group 310 may be recorded in entries of a stored look-up table (e.g., stored look-up table 186 shown in FIG. 1).

In some implementations, each journal 320 may include or be associated with a version number 325. Further, each index 330 may include or be associated with a version number 335. In some implementations, the version number 325 may be compared to the version number 335 to determine whether the journal 320 or the associated index 330 reflects the latest version of metadata. For example, if the version number 325 is greater than the version number 335, it may be determined that the change data included in the journal 320 reflects a state of metadata that is more recent than the metadata stored in the index 330. If so, the index 330 may be updated to include the changes recorded in the journal 320. However, if the version number 325 is smaller than the version number 335, it may be determined that the change data included in the journal 320 reflects a state of metadata that is older than the metadata stored in the index 330. In this situation, the journal 320 may be cleared without updating the index 330. In some implementations, the comparison of the version number 325 to the version number 335 may be performed in response to loading the journal 320 or the associated index 330 from persistent storage into memory (e.g., from persistent storage 140 into memory 115, as shown in FIG. 1).

In one or more implementations, the number of journals 320 included in a journal group 310 may be specified in a stored parameter (e.g., a user setting, a configuration variable, and so forth). In some examples, this parameter may be adjusted or tuned to modify the performance characteristics of input/output (I/O) operations in a storage system. For example, this parameter may be increased to attempt to obtain relatively less frequent write operations of relatively larger size. In another example, this parameter may be decreased to attempt to obtain relatively more frequent write operations of relatively smaller size.

Figure 4:
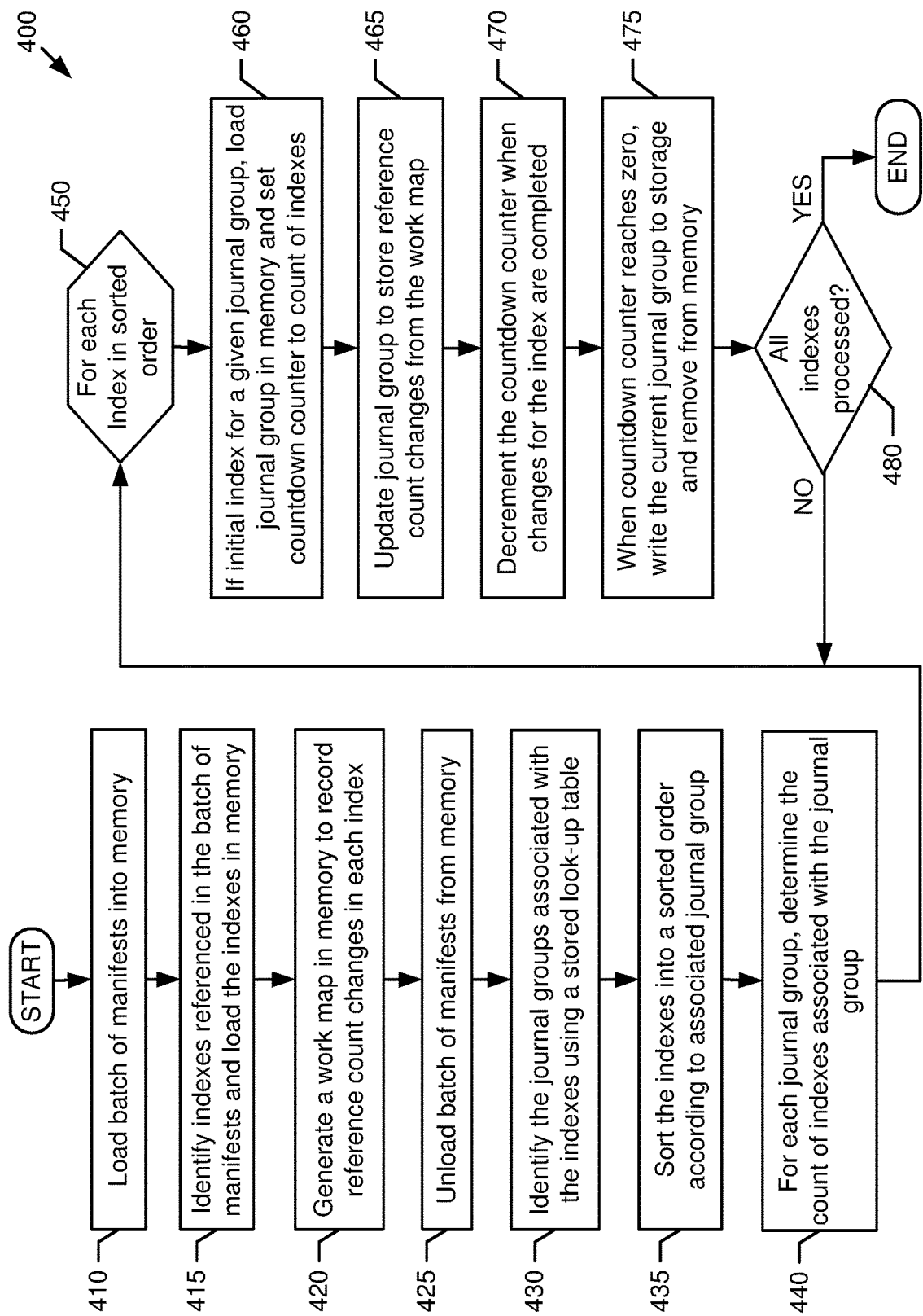
FIG. 4 is an illustration of an example process, in accordance with some implementations.

FIG. 4—Example Process for Metadata Housekeeping

Referring now to FIG. 4, shown is an example process 400 for metadata housekeeping, in accordance with some implementations. The process 400 may be performed by the storage controller 110 executing instructions. The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 400 are described below with reference to FIGS. 1-3, which show examples in accordance with some implementations. However, other implementations are also possible.

Block 410 may include loading a batch of manifests into memory during a housekeeping operation. Block 415 may include identifying indexes referenced in the batch of manifests and loading the indexes into memory. For example, referring to FIG. 1, the storage controller 110 may receive a command or request (e.g., from an internal process, a periodic timer, a client, etc.) to perform a housekeeping process for a batch of manifests 150 (e.g., to reduce reference counts to data units that are no longer included in the manifests 150). In response to the command or request, the storage controller 110 may identify a set of indexes 160 that are referenced by the batch of manifests 150, and may load the identified indexes 160 into the memory 115.

Referring again to FIG. 4, block 420 may include generating a work map in memory to record reference count changes in each index. Block 425 may include unloading the batch of manifests from memory. For example, referring to FIG. 1, the storage controller 110 may use the batch of manifests 150 to determine the reference count changes for each index 160 (e.g., for each data unit referenced by the index 160), and may store this information in a work map 180. After the changes associated with each manifest 150 are included in the work map 180, the storage controller 110 may remove that manifest 150 from the memory 115.

Referring again to FIG. 4, block 430 may include identifying the journal groups associated with the indexes using a stored look-up table. Block 435 may include sorting the indexes into a sorted order according to associated journal group. Block 440 may include, for each journal group, determine the count of indexes associated with the journal group. For example, referring to FIG. 1, the storage controller 110 may use a stored look-up table 186 to identify the journal groups 120 that are associated with the indexes 160, and may sort the indexes 160 according to their associated journal groups 120 (e.g., according to the identifiers of the journal groups 120). The storage controller 110 may also determine, for each journal group 120, the number of associated indexes 160 that are included in the work map (i.e., having reference counts changed by the housekeeping process).

Referring again to FIG. 4, at block 450, a loop (defined by blocks 450, 460, 465, 470, 475, and 480) may be entered to process each index in the sorted order (determined at block 435). Block 460 may include, if the current index is the initial (i.e., first) index to be processed for a given journal group, loading that journal group in memory, and setting a countdown counter to the number of indexes (determined at block 440). For example, referring to FIG. 1, the storage controller 110 may determine that a new index 160 is being processed, and that this new index 160 is the first index 160 in the sorted order to be processed for a particular journal group 120. Accordingly, the storage controller 110 may load the journal group 120 in the memory 115, and may set a countdown counter 182 ("CD counter") equal to the count of indexes 160 associated with that journal group 120. In some implementations, the storage controller 110 may maintain or "pin" the journal group 120 in the memory 115 until all reference count changes have been included in the journal group 120.

Referring again to FIG. 4, block 465 may include updating the journal group to store reference count changes from the work map. Block 470 may include decrementing the countdown counter when changes for the index are completed. Block 475 may include, when countdown counter reaches zero, writing the current journal group to storage, and removing the current journal group from memory. For example, referring to FIG. 1, the storage controller 110 may update the journal group 120 pinned in memory 115 to include the reference counts changes for the current index 160, as indicated by the work map 180. Once all changes for the current index 160 are completed (i.e., are stored in the journal group 120), the storage controller 110 may decrement the countdown counter 182 by one. If the countdown counter 182 reaches zero (i.e., the journal group 120 has been updated to include all reference count changes for the associated indexes 160), the storage controller 110 may write the journal group 120 to persistent storage 140, and may remove the journal group 120 from the memory 115.

Referring again to FIG. 4, decision block 480 may include determining whether all indexes have been processed. If so, the process 400 may be completed. Otherwise, if all indexes have not been processed, the process 400 may return to block 450 (i.e., to begin processing another index). For example, referring to FIG. 1, the storage controller 110 may continue processing the indexes 160 according to the sorted order, until all indexes 160 are processed. In this manner, the storage controller 110 may perform the housekeeping process with a reduced number of instances of loading a journal group 120 into the memory 115, as well as a reduced number of instances of writing the journal group 160 to the persistent storage 140.

FIGS. 5A-5B—Example Data Structures

Referring now to FIG. 5A, shown is an example implementation of the look-up table 186. As shown, the look-up table 186 may include multiple entries or rows. Each entry may correspond to a particular container index. Further, each entry may identify the journal group that is assigned to a particular container index. In some implementations, each entry may be added to the look-up table 186 at the time that the journal group is initially assigned to the index (e.g., at time of creation of the index). Further, in some implementations, the look-up table 186 may be persistently stored in item metadata (e.g., in persistent storage 140 shown in FIG.).

Referring now to FIG. 5B, shown is an example implementation of the work map 180. As shown, the work map 180 may include multiple entries or rows, with each entry corresponding to a particular reference count (i.e., for a specific address or location) included in a particular container index. Further, each entry may specify the change amount for each reference count. In some implementations, each entry may be added to the work map 180 during a housekeeping process. For example, referring to FIG. 1, the storage controller 110 may use the manifests 150 loaded in memory to determine the reference count changes for each index 160 (e.g., for each data unit referenced by the index 160), and may store this information in a corresponding entry of the work map 180. In some implementations, the work map 180 may only be stored in memory 115, and may be deleted after completion of the housekeeping process.

Figure 6:
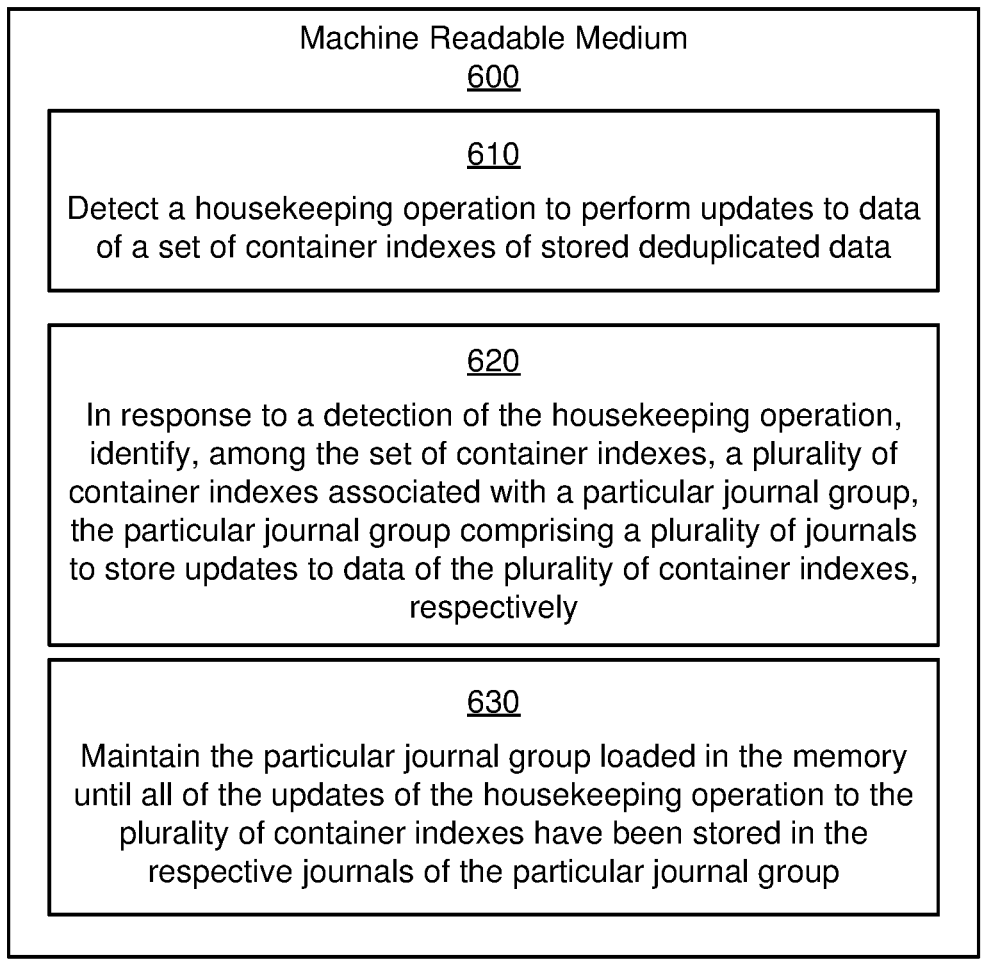
FIG. 6 is a diagram of an example machine-readable medium storing instructions in accordance with some implementations.

FIG. 6—Example Machine-Readable Medium

FIG. 6 shows a machine-readable medium 600 storing instructions 610-630, in accordance with some implementations. The instructions 610-630 can be executed by a single processor, multiple processors, a single processing engine, multiple processing engines, and so forth. The machine-readable medium 600 may be a non-transitory storage medium, such as an optical, semiconductor, or magnetic storage medium.

Instruction 610 may be executed to detect a housekeeping operation to perform updates to data of a set of container indexes of stored deduplicated data. Instruction 620 may be executed to, in response to a detection of the housekeeping operation, identify, among the set of container indexes, a plurality of container indexes associated with a particular journal group, the particular journal group comprising a plurality of journals to store updates to data of the plurality of container indexes, respectively. Instruction 630 may be executed to maintain the particular journal group loaded in the memory until all of the updates of the housekeeping operation to the plurality of container indexes have been stored in the respective journals of the particular journal group.

For example, referring to FIG. 1, the storage controller 110 may receive a command or request to perform a housekeeping process for a batch of manifests 150. In response, the storage controller 110 may identify a set of indexes 160 that are referenced by the batch of manifests 150. Further, the storage controller 110 may identify the journal groups 120 that are associated with the indexes 160, and may sort the indexes 160 according to their associated journal groups 120. Furthermore, the storage controller 110 may load and maintain the journal group 120 in the memory 115 until all reference count changes have been included in the journal group 120.

Figure 7:
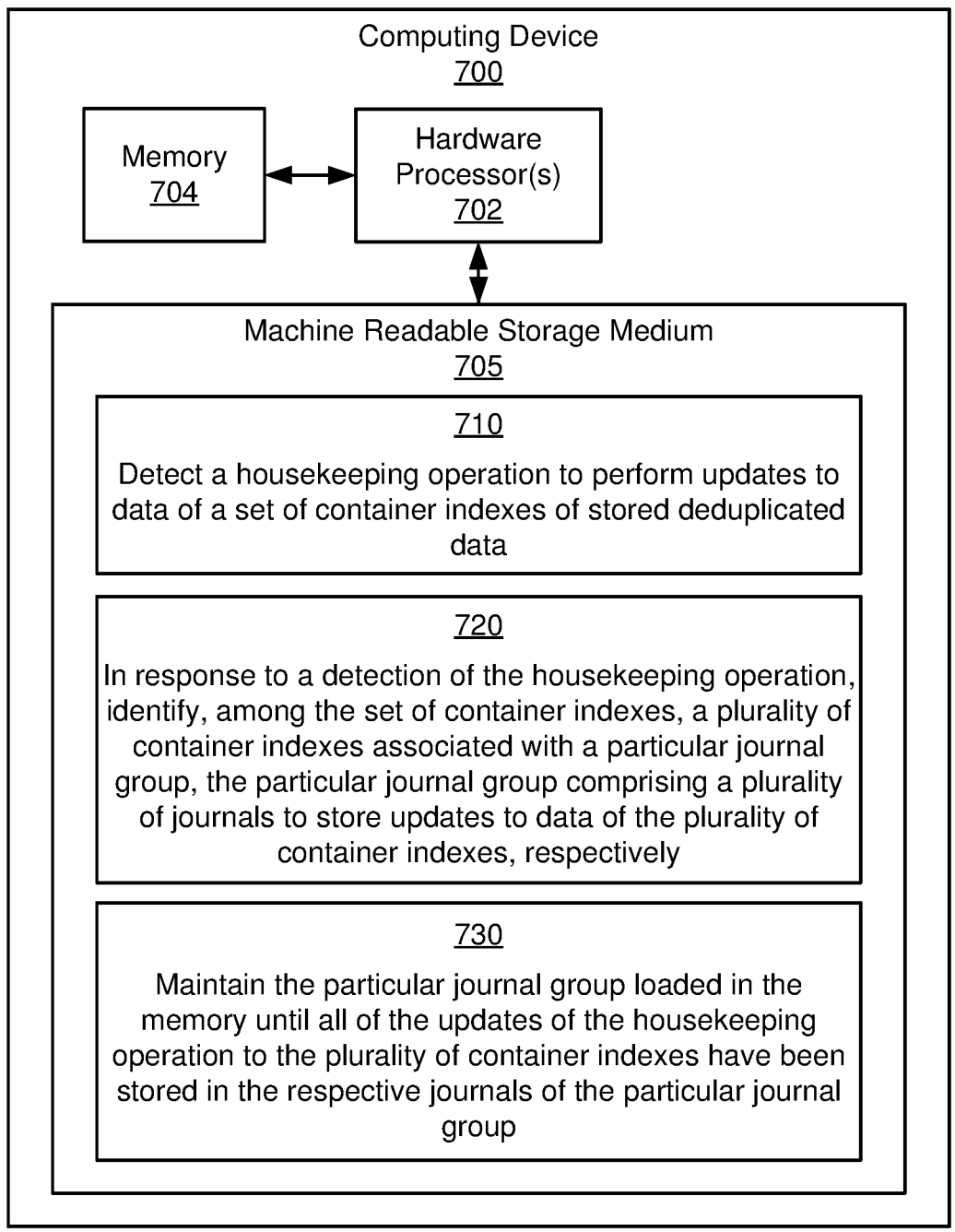
FIG. 7 is a schematic diagram of an example computing device, in accordance with some implementations.

FIG. 7—Example Computing Device

FIG. 7 shows a schematic diagram of an example computing device 700. In some examples, the computing device 700 may correspond generally to some or all of the storage system 100 (shown in FIG. 1). As shown, the computing device 700 may include a hardware processor 702, a memory 704, and machine-readable storage 705 including instructions 710-730. The machine-readable storage 705 may be a non-transitory medium. The instructions 710-730 may be executed by the hardware processor 702, or by a processing engine included in hardware processor 702.

Instruction 710 may be executed to detect a housekeeping operation to perform updates to data of a set of container indexes of stored deduplicated data. Instruction 720 may be executed to, in response to a detection of the housekeeping operation, identify, among the set of container indexes, a plurality of container indexes associated with a particular journal group, the particular journal group comprising a plurality of journals to store updates to data of the plurality of container indexes, respectively. Instruction 730 may be executed to maintain the particular journal group loaded in the memory until all of the updates of the housekeeping operation to the plurality of container indexes have been stored in the respective journals of the particular journal group.

Figure 8:
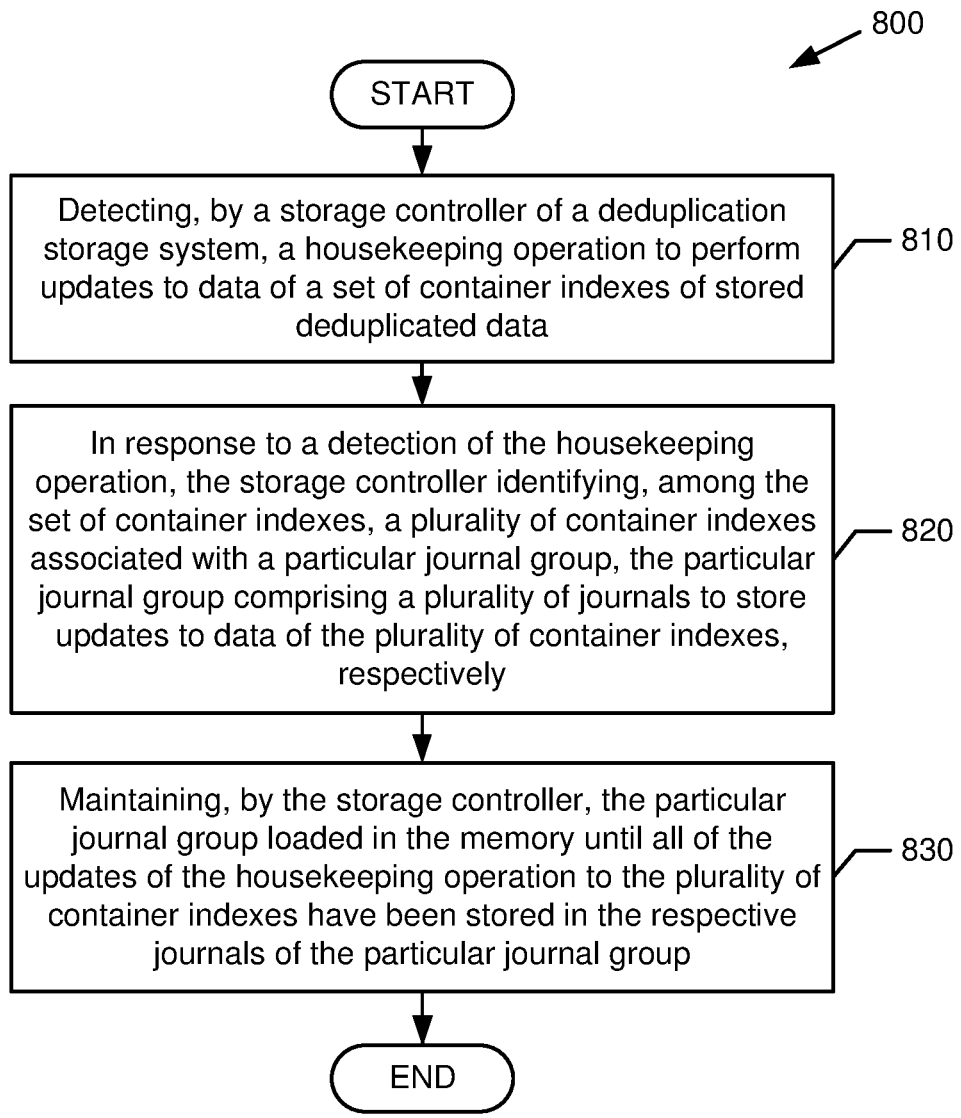
FIG. 8 is an illustration of an example process, in accordance with some implementations.

FIG. 8—Example Process

Referring now to FIG. 8, shown is an example process 800 in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 may be described below with reference to FIGS. 1-3, which show examples in accordance with some implementations. However, other implementations are also possible.

Block 810 may include detecting, by a storage controller of a deduplication storage system, a housekeeping operation to perform updates to data of a set of container indexes of stored deduplicated data. Block 820 may include, in response to a detection of the housekeeping operation, the storage controller identifying, among the set of container indexes, a plurality of container indexes associated with a particular journal group, the particular journal group comprising a plurality of journals to store updates to data of the plurality of container indexes, respectively. Block 830 may include maintaining, by the storage controller, the particular journal group loaded in the memory until all of the updates of the housekeeping operation to the plurality of container indexes have been stored in the respective journals of the particular journal group. After block 830, the process 800 may be completed.

In accordance with implementations described herein, a deduplication storage system may perform a housekeeping operation that includes ordering a set of indexes according to their associated journal groups, and then loading the indexes in memory according to their sorted order. Each journal group may be maintained in memory during the processing of the associated indexes. The pinned journal group may store the changes to the reference counts included in the associated indexes. In some implementations, a countdown counter may be initialized with the number of associated indexes that have changes to their reference counts. As each index is completed, the countdown counter may be decremented. Therefore, when the countdown counter is equal to zero, the journal group has been updated to include all reference count changes for the associated indexes. Accordingly, the journal group is removed from memory, and is written to storage. In this manner, the disclosed technique may reduce the number of instances of loading a journal group into memory and the number of instances of writing the journal group to storage, and may thereby improve the performance of the deduplication storage system Note that, while FIGS. 1-8 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A storage system comprising:
a processor;
a memory; and
a machine-readable storage storing instructions, the instructions executable by the processor to:
   detect a housekeeping operation to perform a set of housekeeping updates to a set of container indexes, each container index comprising storage metadata for deduplicated data units;
   in response to a detection of the housekeeping operation, identify, from the set of container indexes, a subset of container indexes associated with a particular journal group, the particular journal group comprising a plurality of journals to store updates to storage metadata included in the subset of container indexes, wherein each journal of the particular journal group is to exclusively store updates to the storage metadata included in a different container index of the subset of container indexes; and
   maintain, during the housekeeping operation, the particular journal group loaded in the memory until all of the subset of housekeeping updates have been recorded in the respective journals of the particular journal group.

2. The storage system of claim 1, wherein the housekeeping operation is to update reference counts included in the set of container indexes based on a batch of manifests, and wherein the set of container indexes are referenced by the batch of manifests.

3. The storage system of claim 1, including instructions executable by the processor to:
   load the set of container indexes in the memory;

determine a plurality of reference count changes associated with the set of container indexes; and
generate a work map based on the plurality of reference count changes.

4. The storage system of claim 1, including instructions executable by the processor to:
identify, using a stored look-up table, a plurality of journal groups associated with the set of container indexes; and
sort the set of container indexes into a sorted order according to their associated journal groups.

5. The storage system of claim 4, including instructions executable by the processor to:
for each journal group of the plurality of journal groups, determine a count of container indexes associated with the journal group.

6. The storage system of claim 5, including instructions executable by the processor to:
select a particular container index according to the sorted order, wherein the particular container index is associated with the particular journal group; and
in response to a determination that the particular container index is an initial container index to be processed for the particular journal group:
load the particular journal group in the memory; and
set a countdown counter equal to the count of container indexes associated with the particular journal group.

7. The storage system of claim 6, including instructions executable by the processor to:
update the particular journal group to store reference count changes associated with the particular container index; and
decrement the countdown counter in response to a determination that the particular journal group includes all reference count changes associated with the particular container index.

8. The storage system of claim 7, including instructions executable by the processor to:
in response to a determination that the countdown counter has reached zero:
write the particular journal group to a persistent storage; and
remove the particular journal group from the memory.

9. A method comprising:
detecting, by a storage controller of a deduplication storage system, a housekeeping operation to perform a set of housekeeping updates to a set of container indexes, each container index comprising storage metadata for deduplicated data units;
in response to a detection of the housekeeping operation, the storage controller identifying, from the set of container indexes, a subset of container indexes associated with a particular journal group, the particular journal group comprising a plurality of journals to store updates to storage metadata included in the subset of container indexes, wherein each journal of the particular journal group is to exclusively store updates to the storage metadata included in a different container index of the subset of container indexes; and
during the housekeeping operation, maintaining, by the storage controller, the particular journal group loaded in memory until all of the subset of housekeeping updates have been recorded in the respective journals of the particular journal group.

10. The method of claim 9, wherein the housekeeping operation is to update reference counts included in the set of container indexes based on a batch of manifests, and wherein the set of container indexes are referenced by the batch of manifests.

11. The method of claim 9, further comprising:
loading the set of container indexes in the memory;
determining a plurality of reference count changes associated with the set of container indexes; and
generating a work map based on the plurality of reference count changes.

12. The method of claim 9, further comprising:
identifying, using a stored look-up table, a plurality of journal groups associated with the set of container indexes; and
sorting the set of container indexes into a sorted order according to their associated journal groups.

13. The method of claim 12, further comprising:
for each journal group of the plurality of journal groups, determining a count of container indexes associated with the journal group;
selecting a particular container index according to the sorted order, wherein the particular container index is associated with the particular journal group; and
determining whether the particular container index is an initial container index to be processed for the particular journal group; and
in response to a determination that the particular container index is the initial container index to be processed for the particular journal group:
loading the particular journal group in the memory; and
setting a countdown counter equal to the count of container indexes associated with the particular journal group.

14. The method of claim 13, further comprising:
updating the particular journal group to include reference count changes associated with the particular container index; and
decrementing the countdown counter in response to a determination that the particular journal group includes all reference count changes associated with the particular container index.

15. The method of claim 14, further comprising:
determining whether the countdown counter has reached zero; and
in response to a determination that the countdown counter has reached zero:
writing the particular journal group to a persistent storage; and
removing the particular journal group from the memory.

16. A non-transitory machine-readable medium storing instructions that upon execution cause a processor to:
detect a housekeeping operation to perform a set of housekeeping updates to a set of container indexes, each container index comprising storage metadata for deduplicated data units;
in response to a detection of the housekeeping operation, identify, from the set of container indexes, a subset of container indexes associated with a particular journal group, the particular journal group comprising a plurality of journals to store updates to storage metadata included in the subset of container indexes, wherein each journal of the particular journal group is to exclusively store updates to the storage metadata included in a different container index of the subset of container indexes; and
maintain, during the housekeeping operation, the particular journal group loaded in memory until all of the subset of housekeeping updates have been recorded in the respective journals of the particular journal group.

17. The non-transitory machine-readable medium of claim 16, wherein the housekeeping operation is to update reference counts included in the set of container indexes based on a batch of manifests, and wherein the set of container indexes are referenced by the batch of manifests.

18. The non-transitory machine-readable medium of claim 16, including instructions that upon execution cause the processor to:
    load the set of container indexes in the memory;
    determine a plurality of reference count changes associated with the set of container indexes;
    generate a work map based on the plurality of reference count changes;
    identify, using a stored look-up table, a plurality of journal groups associated with the set of container indexes; and
    sort the set of container indexes into a sorted order according to their associated journal groups.

19. The non-transitory machine-readable medium of claim 18, including instructions that upon execution cause the processor to:
    for each journal group of the plurality of journal groups, determine a count of container indexes associated with the journal group;
    select a particular container index according to the sorted order, wherein the particular container index is associated with the particular journal group; and
    in response to a determination that the particular container index is an initial container index to be processed for the particular journal group:
        load the particular journal group in the memory; and
        set a countdown counter equal to the count of container indexes associated with the particular journal group.

20. The non-transitory machine-readable medium of claim 19, including instructions that upon execution cause the processor to:
    update the particular journal group to store reference count changes associated with the particular container index;
    decrement the countdown counter in response to a determination that the particular journal group includes all reference count changes associated with the particular container index; and
    in response to a determination that the countdown counter has reached zero:
        write the particular journal group to a persistent storage; and
        remove the particular journal group from the memory.

* * * * *